(12) United States Patent
Hill et al.

(10) Patent No.: US 7,117,374 B2
(45) Date of Patent: Oct. 3, 2006

(54) APPARATUS AND METHOD FOR GATHERING AND UTILIZING DATA

(75) Inventors: Richard A. Hill, Everett, WA (US); Richard Penn, Sammamish, WA (US); Ewald Schoemig, Seattle, WA (US); Egil K. Summers, Stanwood, WA (US); William H. Lace, Lynnwood, WA (US); Louis D. Pheil, Redmond, WA (US)

(73) Assignee: Intermec IP CORP, Everett, WA (US)

( * ) Notice: Subject to any disclaimer, the term of this patent is extended or adjusted under 35 U.S.C. 154(b) by 676 days.

(21) Appl. No.: 09/816,608

(22) Filed: Mar. 23, 2001

(65) Prior Publication Data

US 2002/0078363 A1 Jun. 20, 2002

Related U.S. Application Data

(60) Provisional application No. 60/191,914, filed on Mar. 24, 2000.

(51) Int. Cl.
*G06F 11/30* (2006.01)

(52) U.S. Cl. ............... 713/193; 713/189; 713/202; 380/282; 235/472.02; 235/472.03; 235/476; 340/572.1; 711/163; 711/164

(58) Field of Classification Search ............ 713/189, 713/193, 202; 380/282; 235/472.02, 472.03, 235/476; 340/572.1; 711/163, 164
See application file for complete search history.

(56) References Cited

U.S. PATENT DOCUMENTS

| 4,418,277 | A | * | 11/1983 | Tremmel et al. | 235/472.02 |
|---|---|---|---|---|---|
| 4,471,218 | A | * | 9/1984 | Culp | 235/462.46 |
| 4,959,541 | A | * | 9/1990 | Boyd | 250/237 R |
| 5,030,807 | A | | 7/1991 | Landt | |
| 5,557,678 | A | * | 9/1996 | Ganesan | 380/282 |
| 5,949,335 | A | * | 9/1999 | Maynard | 340/572.1 |
| 5,960,085 | A | * | 9/1999 | de la Huerga | 340/5.61 |
| 6,072,468 | A | * | 6/2000 | Hocker et al. | 345/157 |
| 6,084,528 | A | | 7/2000 | Beach | |
| 6,137,476 | A | * | 10/2000 | Hocker et al. | 345/163 |
| 6,149,063 | A | * | 11/2000 | Reynolds et al. | 235/472.02 |
| 6,232,870 | B1 | * | 5/2001 | Garber et al. | 340/10.1 |
| 6,317,028 | B1 | * | 11/2001 | Valiulis | 340/10.1 |
| 6,360,208 | B1 | * | 3/2002 | Ohanian et al. | 705/31 |
| 6,536,666 | B1 | * | 3/2003 | Hudrick | 235/462.15 |
| 6,578,767 | B1 | * | 6/2003 | Barkan et al. | 235/462.43 |
| 6,640,214 | B1 | * | 10/2003 | Nambudiri et al. | 705/26 |
| 6,718,467 | B1 | * | 4/2004 | Trostle | 713/171 |
| 2002/0008143 | A1 | * | 1/2002 | Bridgelall | 235/462.13 |
| 2003/0061113 | A1 | * | 3/2003 | Petrovich et al. | 705/26 |

OTHER PUBLICATIONS

Just Scan it, Learning, Palo Alto: Nov./Dec. 1996, vol. 25, Iss. 3, p. 17, 1pg.*
U.S. Appl. No. 09/788,628, Feb. 14, 2001, Wilkof, C., Method and Apparatus for Accessing Product Information Using Bar Code Data.

* cited by examiner

*Primary Examiner*—Avaz Sheikh
*Assistant Examiner*—Taghi T. Arani

(57) ABSTRACT

Disclosed is a device and method for obtaining and utilizing data. A handheld device which is capable of optically scanning or receiving RFID signals from an object, storing the data in an internal memory, and then re-transmitting the data is disclosed. The re-transmitted data may trigger access to an internet web site or other database which provides a user with detailed information relating to the scanned object. The device is also usable as a re-configurable electronic key or may be built into electronic devices to allow reconfiguration by scanning a symbol.

44 Claims, 17 Drawing Sheets

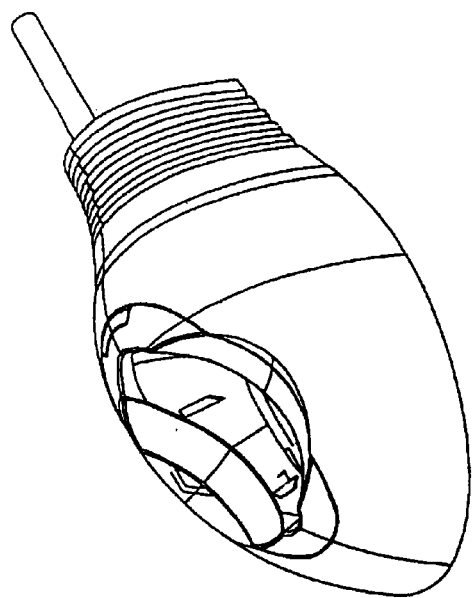
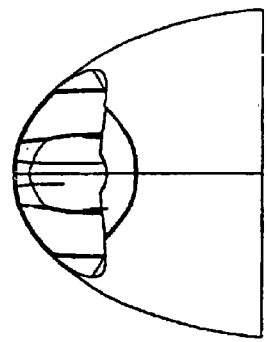
Figure 10C
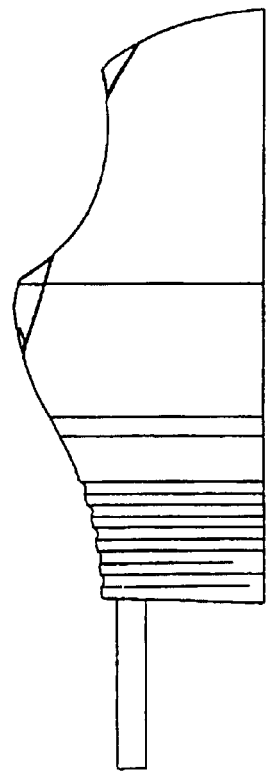
Figure 10B

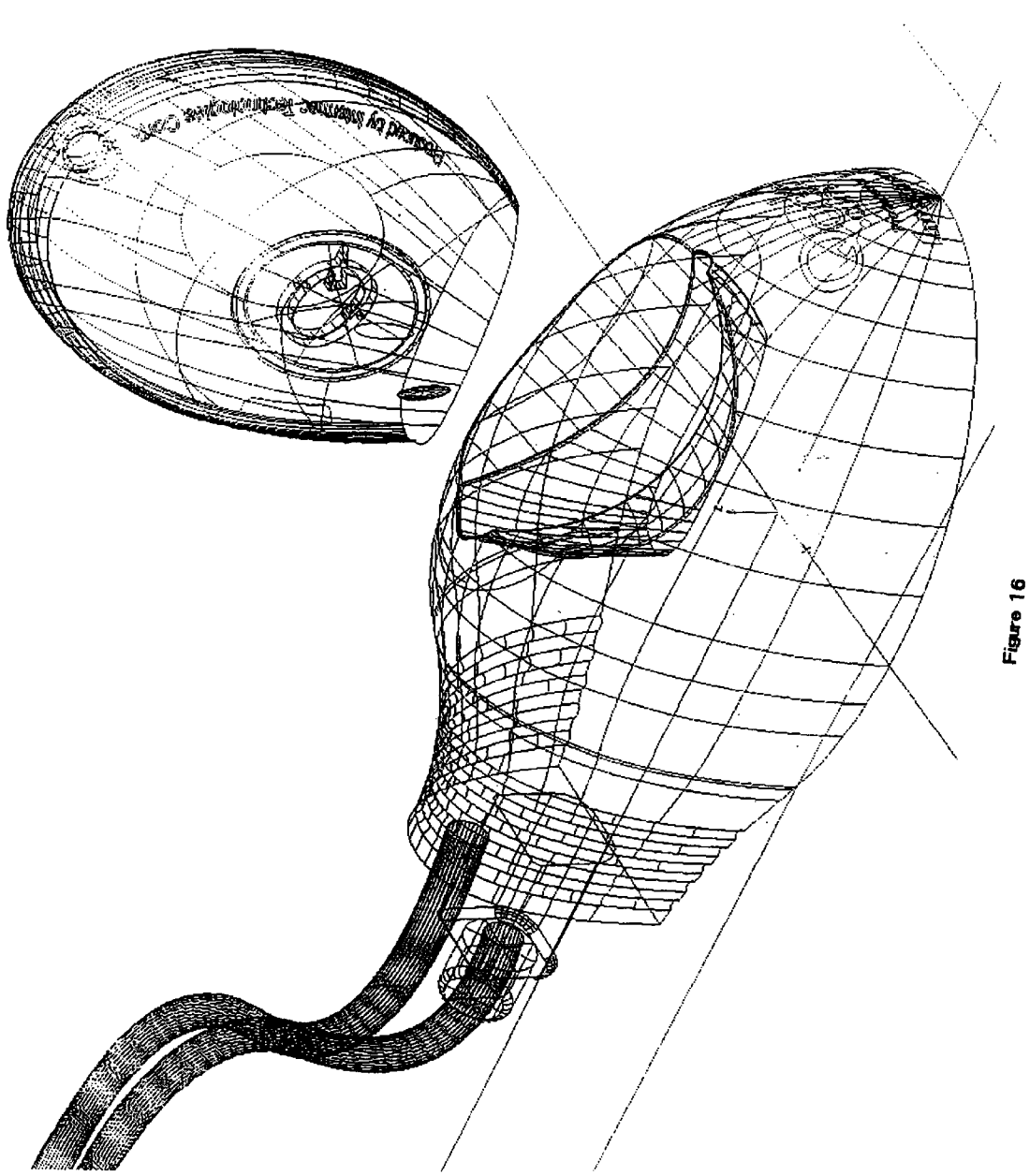

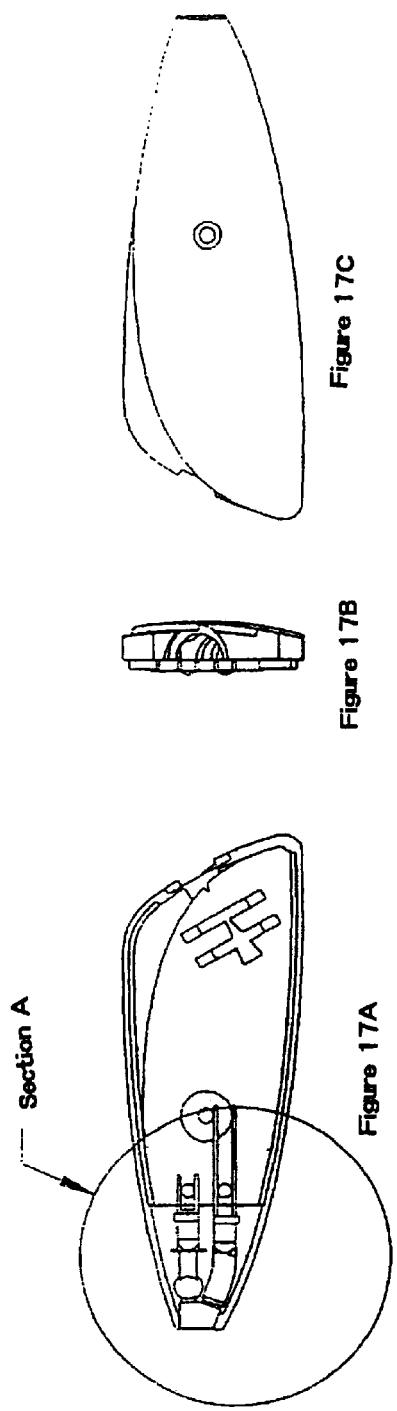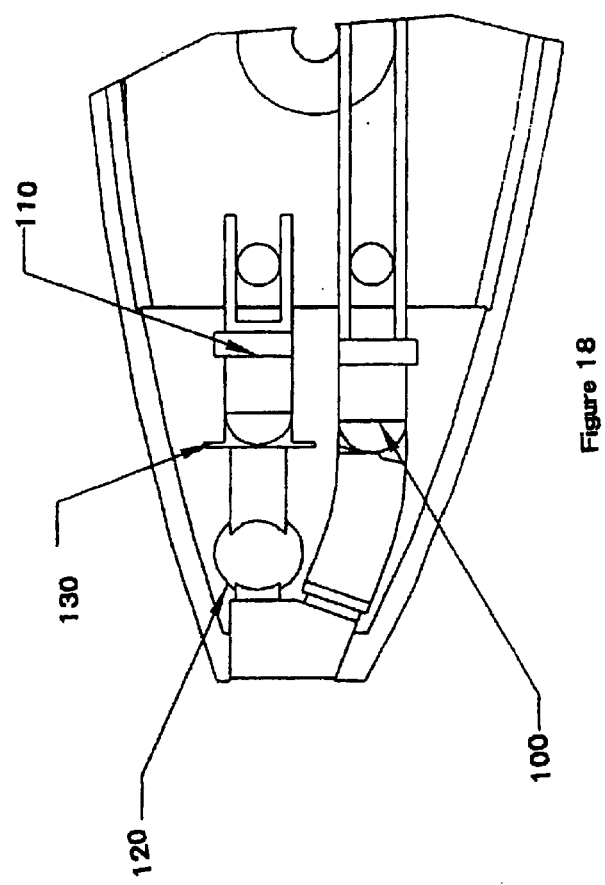

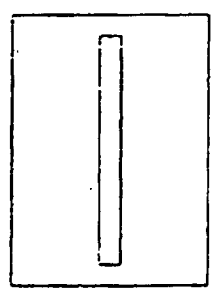
Figure 19A
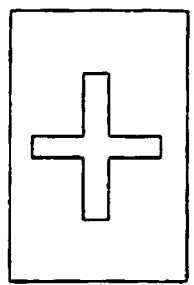
Figure 19B
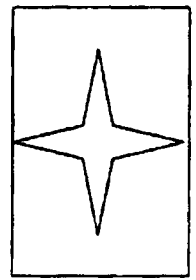
Figure 19C
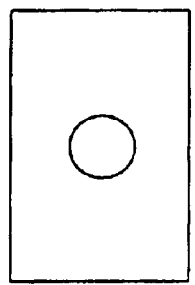
Figure 19D
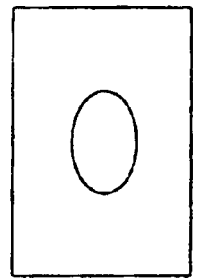
Figure 19E
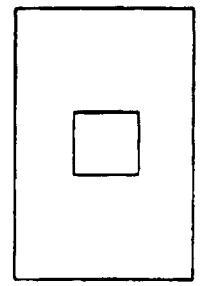
Figure 19F

APPARATUS AND METHOD FOR GATHERING AND UTILIZING DATA

This application claims benefit of U.S. Provisional Application No. 60/191,914, filed Mar. 24, 2000.

BACKGROUND OF THE INVENTION

1. Field of the Invention

The present invention is directed to an apparatus and method for gathering data with a portable handheld device, and then transmitting the data for further use. The data gathered may be in the form of a bar code or other machine readable symbology, or in the form of radio frequency identification (RFID) data.

2. Description of Related Art

In the past, various devices have been proposed for gathering data. The gathering of machine readable information is a broad field having many specific applications. Machine readable symbologies and scanning equipment have been described in detail in a number of publications, including "The Bar Code Book" by Roger C. Palmer, hereby incorporated by reference.

Machines are also able to read data via "radio". Passive RFID circuits or passive reflector transceivers (PFTs) are read by an interrogator. The interrogator activates an RFID or PFT via a transmitted signal that illuminates a receiving antenna with sufficient energy to activate the circuit and then allow the circuit to transmit its stored data via a modulated passive reflection of the interrogator's signal. RFID circuits connected to supporting logic circuitry may be used as a memory storage component and or as a communication or output means for a device.

RFID technology is described in "Perspectives in Radio Frequency Identification" by Ron Ames, also incorporated by reference. RFID's capable of being both remotely read and written to are described in U.S. Pat. No. 5,030,807, hereby incorporated by reference. Use of RFID's as a low power communication means is disclosed in U.S. patent application Ser. No. 09/816,607, assigned to Intermec Corporation, titled "Tetherless Scanner with RFID Tag", filed Mar. 23, 2001 and hereby incorporated by reference.

Bar codes located on consumer products/packaging identify the products during inventory, distribution and automated check out. Bar codes may also be used to identify products and then link a user to related information about the products via databases and or the internet. Methods and apparatus for linking a user to information related to a specific barcode are disclosed in U.S. patent application Ser. No. 09/788,628, assigned to Intermec Corporation, titled "Method and Apparatus for Accessing Product Information Using Barcode Data", filed Feb. 14, 2001 and hereby incorporated by reference.

An affordable apparatus and or method for gathering machine readable information, for example, relating to products for potential purchase, and then utilizing the data to assist in purchasing decisions has not previously been available. For example, a consumer upon entering any retail sales facility is presently incapable of obtaining all of the information which may be relevant to an eventual purchase. The information normally available about potential items for purchase has normally been limited to sales brochures and other small bits of information.

U.S. Pat. No. 6,084,528 discloses an elaborate wireless networked consumer scanning device which optionally includes a video or audio display for use within a defined area for providing on demand information relating to a scanned symbol to a user. Usable only within the range of the wireless network, this system is expensive and limited by a typical local wireless network's operating range of only a single commercial outlet's location.

For the general public to adopt this technology, it must be of a size that allows it to be carried at all times to any location without being a noticeable burden. Also, the cost of the device cannot be so large as to overcome the benefit it provides.

Previous "compact" data acquisition and temporary storage devices have a size that is still too large to be carried by a user at all times. U.S. Pat. No. 4,471,218 discloses a portable data entry terminal that can optically scan a bar code into memory and then optically transfer the scanned code to a host computer. Disclosed as having a wand-type form, this early device was too large to be readily carried by users at all times and has a cost of manufacture that places it out of range of general consumer distribution. Further, this device does not have the ability to differentiate between different bar code symbologies and must scan a symbol in a specific direction to obtain a correct reading. International Application Publication WO 00/39742 discloses a "compact" bar code scanner that weighs 75 grams and has a size that is to large to be a carry along, filling an average users hand. The scanner has cavity electrical connections for a docking device that are easily fouled and again, a cost of manufacture that puts it out of range for general consumer distribution.

An object of the present invention is to provide an inexpensive to manufacture handheld data gathering device small enough to be carried at all times, for example, carried in a pocket on a users key chain or integrated into common consumer devices. The device may be used, for example, to scan products of interest at any location and store identifying information for further processing after the consumer leaves the retail establishment. The gathered identifying information may be downloaded to a computer means and used to obtain further detailed information about the products observed in the retail establishment from an information database and or over the internet.

Other objects of the invention are revealed to one skilled in the art by review of the following description and claims.

SUMMARY OF THE INVENTION

The present invention relates to a handheld device for gathering information, and then for transmitting the information in order to enable further processing.

The invention comprises a handheld portable scanning device "mobile data acquisition and transferal apparatus (MDATA)" which may be used to scan bar code or other machine readable symbology information or RFID stored information, and then store the information in the portable device. The information is downloaded to a computer means, for example a home computer or internet portal, and the gathered information used for accessing databases, internet web sites or specific video content via digital cable/ satellite systems which may contain/present further detailed information about the originally scanned objects or services.

Portable, small enough to be carried by user at all times, the device may be built into many forms, examples of which are: pens, wands, keys, keyfobs, or integrated into existing automobile remote "keys", pagers, flashlights or internet enabled cell phones and handheld computers.

By referencing an electronic serial number embedded in an MDATA, a users interests and or purchases can be recorded. The MDATA can also function as a re-configurable electronic key and as a smart credit card for automated purchasing or order recording.

The device is designed for high volume manufacture at a minimal unit cost. This promotes rapid market penetration and consumer acceptance of the technology.

BRIEF DESCRIPTION OF THE DRAWINGS

FIG. 10A is an isometric view of one embodiment of the docking device.

FIG. 10B is a side view of one embodiment of the docking device.

FIG. 10C is a front view of one embodiment of the docking device.

FIG. 16 is an isometric wire-frame view of one embodiment of a docking device and a mating MDATA.

FIG. 17A is a side view of an MDATA, with one half of the cover removed to expose the PCB and optical elements.

FIG. 17B is a front end view of the MDATA of FIG. 17A.

FIG. 17C is a back side view of the MDATA of FIG. 17A.

FIG. 18 is a blow up of section A of FIG. 17A, detailing optical elements of the scanner.

FIG. 19A is a front view of a slit aperture.

FIG. 19B is a front view of a cross aperture.

FIG. 19C is a front view of a star aperture.

FIG. 19D is a front view of a circle aperture.

FIG. 19E is a front view of an elipsoid aperture.

FIG. 19F is a front view of a rectangular aperture.

DETAILED DESCRIPTION OF THE INVENTION

As shown in FIGS. 6A–D, in one embodiment of the device, a handheld scanner/transmitter is in the form of a keyfob. A typical weight and size of this embodiment of an MDATA is: 20 grams, 4.29 cm wide, 6.81 cm long and 1.40 cm high. The dramatic size and weight reduction over previous devices allows a user to carry the MDATA with them at all times, ready for use when an object of interest containing a machine readable symbology is encountered. The form and function of the body of the MDATA encourages proper usage in a range of natural low fatigue postures. A further embodiment, shown in FIGS. 6E–H is smaller and lighter, having approximate dimensions of 6.4 cm long, 2 cm high and 1.1 cm wide. This embodiment has a volume less than 14 cubic centimeters.

Figure 1:
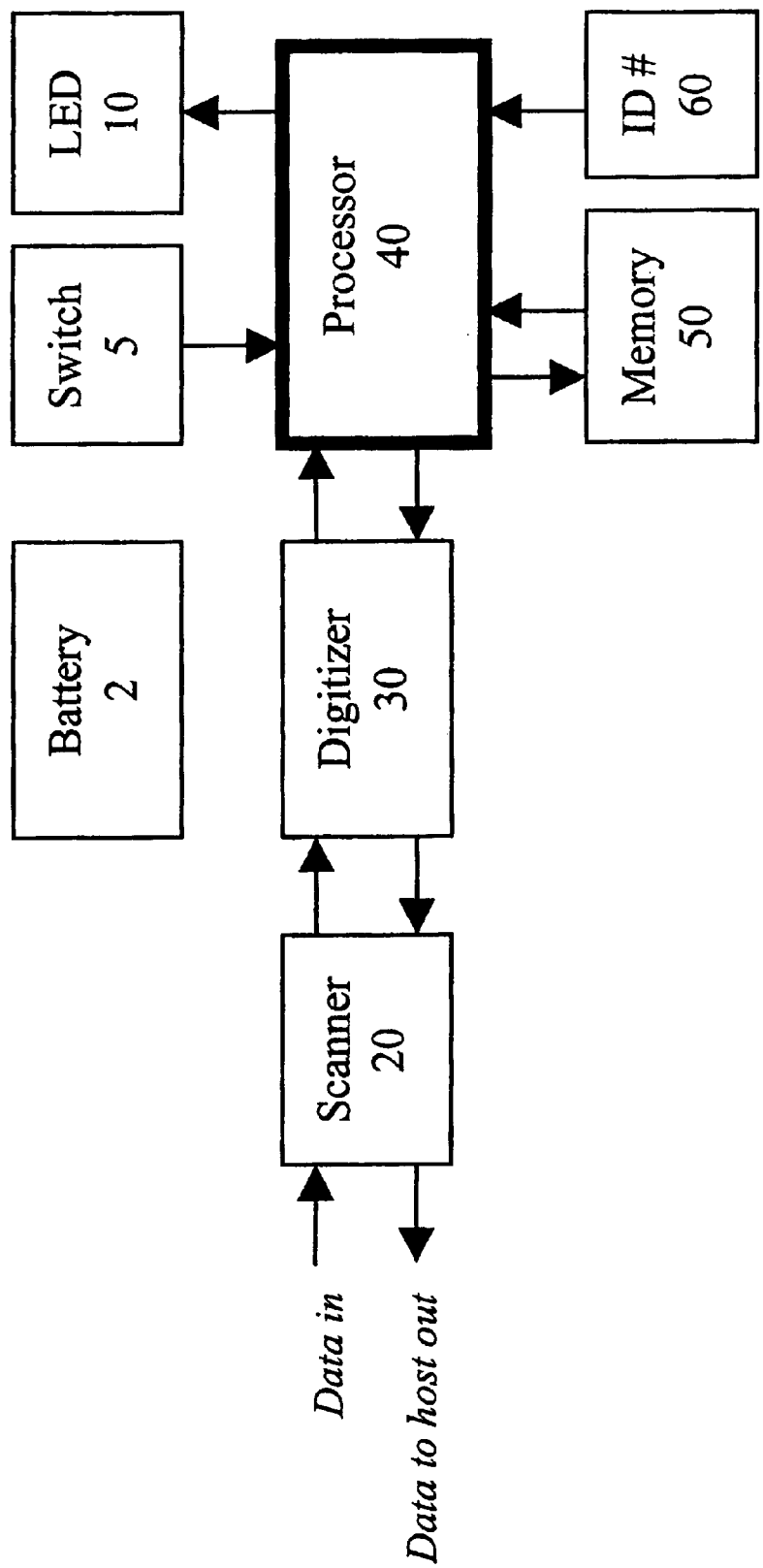
FIG. 1 is a block diagram of the MDATA.

As shown in block form in FIG. 1, this embodiment of the device comprises the elements of a scanner 20, an analog/digital digitizer 30, a processor 40, a memory 50, a battery 2, a switch 5, a Light Emitting Diode (LED) 10 and an internal individual electronic serial or ID number 60. Internally, the elements are interconnected via a printed circuit board.

In an optical embodiment, shown in FIG. 18, scanner 20 includes an emitter 100, optical sensor/receiver 110, and a lens 120 to focus the optical signals. To increase depth of field, reduce ambient light noise and fix the allowed scanning directions, an aperture 130 may be used. Lens 120, may be spherical, capturing light from a wide angle. Other embodiments include the scanning of sound, RF, infra red, RFID or other data forms/signals. A digitizer 30 which may be an A/D converter, a wave shaper circuit or a software routine may be included to process signals from and to the scanner 20 into proper form for input or further processing by the processor 40 or backwards for output through the scanner 20. A decoder optimized within the processor 40 with software or firmware, translates the selected machine readable codes or control inputs.

In one embodiment, the machine readable codes include: ISBN, UPC-E, UPC-A, EAN-8, EAN-13, Code 39, Code 128 and I 2 of 5. To allow as large a range of codes as possible to be read within a limited size decoder routine, extensions of these symbologies and characters beyond the simple ASCII set can be omitted or substituted with spaces. Where 2d, charged coupled device (CCD) or image scanning is used, optical character recognition (OCR) may be used.

The switch 5 is used for turning on the device for scanning or initiating a data transfer. The switch 5 may be a capacitance type, a proximity sensor, an LED reflectance type or a mechanical switch. A mechanical switch with a tactile feedback ("snap" action upon activation) lets the user know each time the switch has been successfully activated.

The memory 50 is used for storing received data, prior to downloading. The memory may be an EEPROM, RFID or other form of static or dynamic memory. Removable memory "sticks" or "cards" may be used, providing unlimited data capacity.

Figure 2:
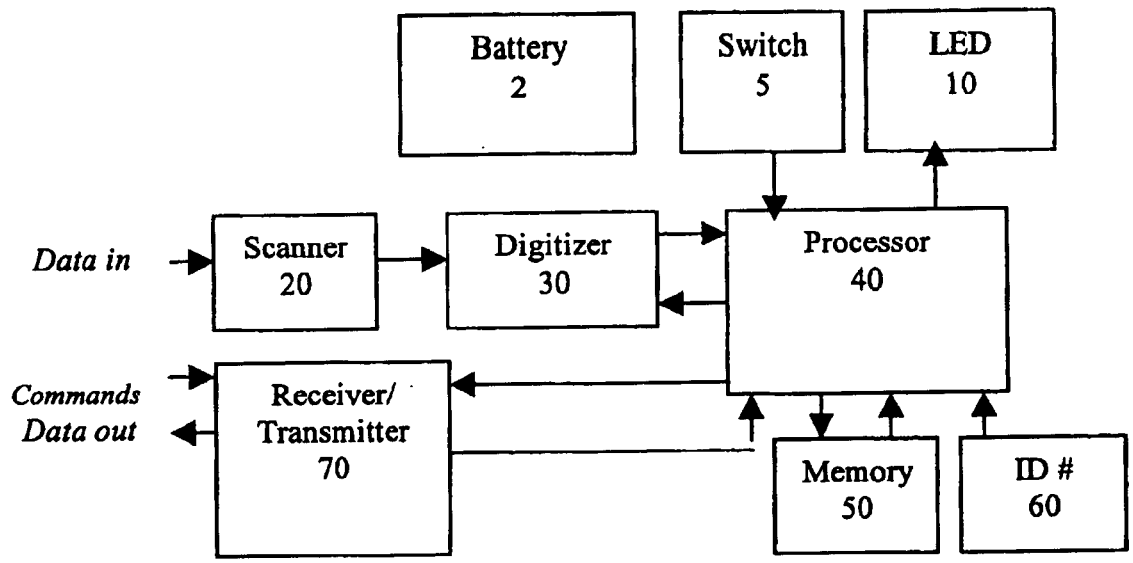
FIG. 2 is a block diagram of another embodiment of the MDATA.

As shown in FIG. 2, the MDATA may use a transmitter/receiver other than the scanner 20 for output and receiving control/configuration commands. The transmitter/receiver communication means may take any form, including optical, direct electro-mechancal connection, infra red, sound or RFID.

In the case of RFID, RF or RFDC information transmission, the data may be transmitted by the Bluetooth, HomeRF, IEEE P802.15 or proprietary protocols in the 900 megahertz, 2.4 gigahertz or other frequency band.

Figure 13:
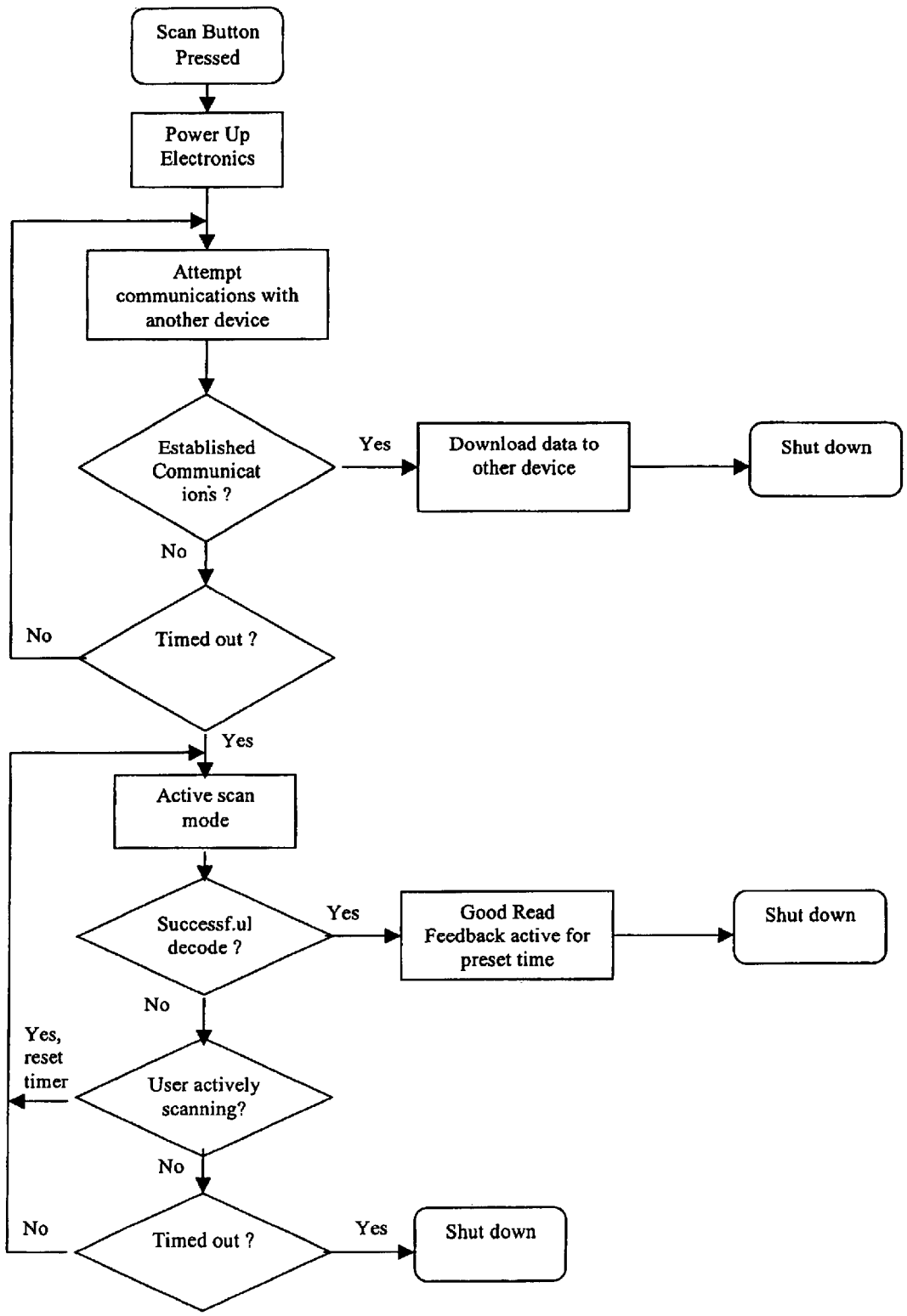
FIG. 13 is a block diagram of an MDATA power management routine.

Power management routines optimize the life of the battery 2. The MDATA is activated by pressing the switch 5. Once pressed the switch may be released, the power management routines taking over to automatically determine the deactivation of the MDATA. As shown in FIG. 13, MDATA is activated by a single press on the switch 5. The MDATA will start and continue to operate whether the switch 5 is released or not during operation, freeing the user to focus on either scanning target data or monitoring a download. In the case of an optical data download, this allows the user to release the MDATA in the docking cavity, minimizing the chance that the MDATA will be disturbed thereby corrupting the communications. At power-up, the MDATA automatically tries to establish communication with the docking station (or other device) If within a certain timeout communications can be established, the data download process is initiated, all stored data is downloaded and the MDATA is shut down once the download has been completed. If no communication to the docking station (or other device) can be established after a certain timeout, the MDATA automatically switches into active scan mode. The communications attempt occurs so fast that the user will not notice any delay during an attempted data acquisition. In active scan mode the MDATA remains operational and in active scan mode until one of the following conditions is satisfied:

1) No active scanning action by the user has been detected for some time: Optical embodiments of the MDATA detect, for example, switches between "black and white" fields picked up by the scanner. RFID embodiments of the MDATA detect the presence of illuminated RFID tags in the RF field, indicating that the user is actively attempting to scan a code/detect a machine readable code. If active scanning is detected the active scan timeout counter is reset. If not active scanning action has been detected and a scan mode timeout has expired the device is turned off until the scan button is activated again.

2) A barcode/machine-readable code has been detected, successfully decoded and stored on the device. This is indicated by a "good read LED", or other audible cues, or vibrating device. After this cue the device is turned off and operation ceases until the scan button is activated again.

Also, after a delay period, the MDATA deactivates after repeated failed data transfer attempts.

The above procedure separates the different operating modes for active scanning and communication (time-multiplexing of tasks). This minimizes the current draw from the battery and extends battery life.

The battery 2 may be one or more standard power cells, for example lithium type, or a molded polymeric or elastomer battery which could be shaped to form the actual housing of the MDATA. For minimum cost of manufacture, the battery 2 may be sealed within the MDATA, not user replaceable. The power management routines allow a design operating life of three years (10,000 scans and 500 data transfer events). Alternatively, the battery may be rechargeable or user replaceable. Charging circuitry may be integrated into the docking device.

The MDATA may contain a light, vibration and/or sound output means for user feedback. Feedback could be, for example, acknowledging to the user that an attempted scan of an object was successful. This output signal may also be utilized to acknowledge error status, a full memory and/or a cleared memory on the MDATA. An LED 10 provides an extremely low power consuming and rugged output means for user feedback.

Figure 3:
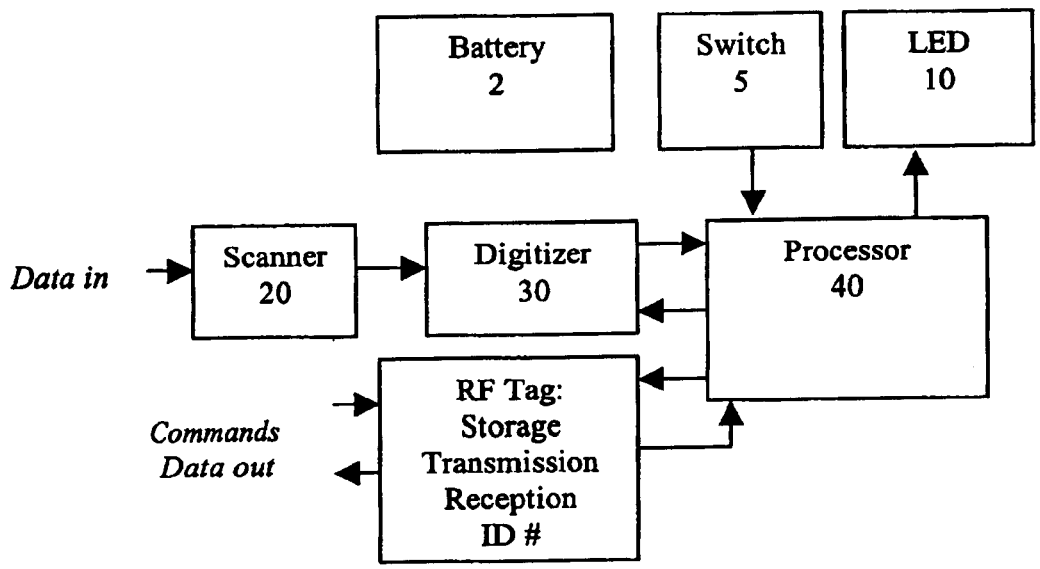
FIG. 3 is a block diagram of another embodiment of the MDATA, utilizing an RFID tag for data storage and transmission.

As shown in FIG. 3, the MDATA may use an RFID tag as a communication/transfer means, a storage means and as the location for the MDATA's electronic serial number. Data loaded onto the RFID by the MDATA can be read by an interrogator connected to a computer means. This form of data downloading is extremely MDATA power efficient, requiring only logic power from the MDATA, all data transfer energy is provided by the interrogator. A read-write capable RFID may be used to receive data sent to the MDATA by interrogator radio beams which are directed at or which the MDATA passes through. To allow scanning of RFID tags, the MDATA can incorporate an interrogator.

Figure 4:
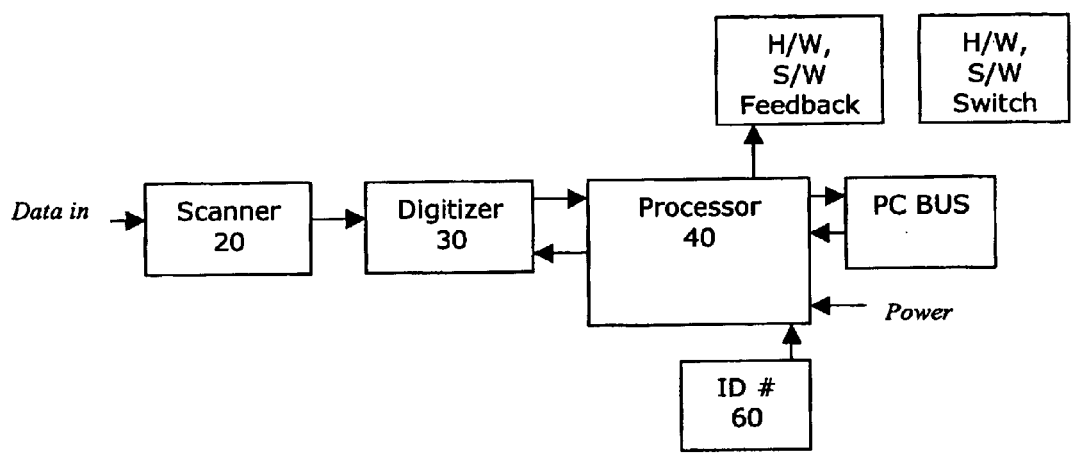
FIG. 4 is a block diagram of an MDATA configured for direct connection with a host computer device.

As shown in FIG. 4, the MDATA may be configured to attach to a host computer means and thereby use the host computer means to obtain power, storage, direct download and software control functionality. The connection to the host computer means may be by any means providing direct connection to the host computers bus. For example, an MDATA may be built into or have a connection via a PCMCIA card, PC card, flash card, USB or proprietary connection, for example to a PDA, cell phone or optical mouse.

Figure 5:
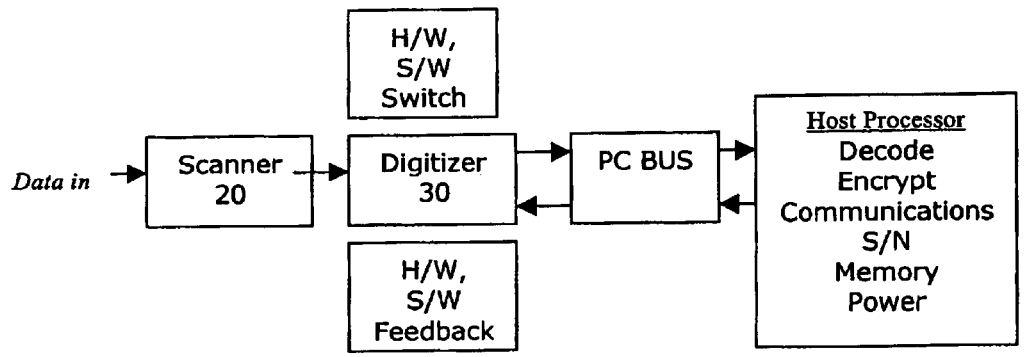
FIG. 5 is a block diagram of an MDATA integrated into a host computer device.
Figure 6B:
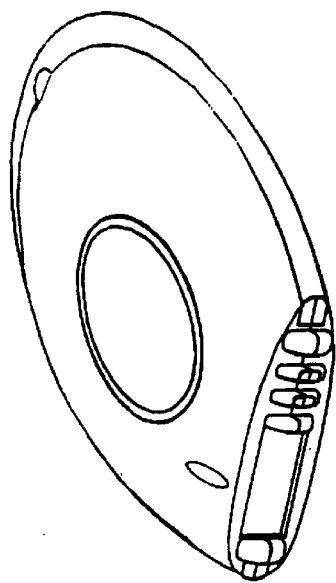
FIG. 6B is an isometric view of one embodiment of the MDATA in keyfob form.
Figure 6D:
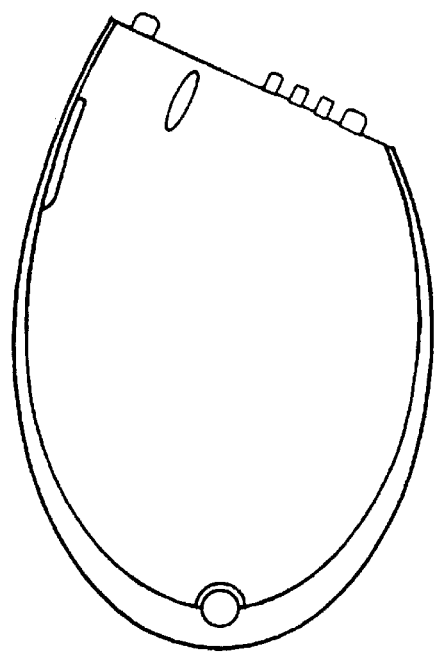
FIG. 6D is a back side view of one embodiment of the MDATA in keyfob form.
Figure 6A:
FIG. 6A is a top edge view of one embodiment of the MDATA in keyfob form.
Figure 6C:
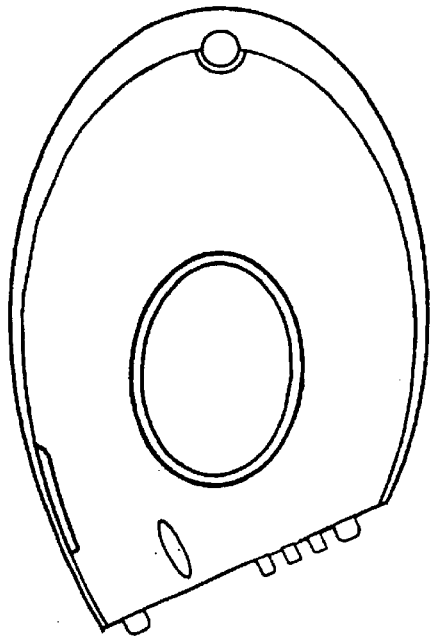
FIG. 6C is a front side view of one embodiment of the MDATA in keyfob form.
Figure 6F:
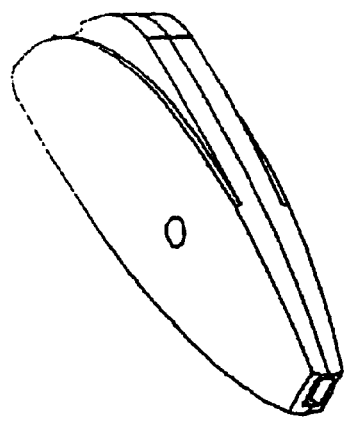
FIG. 6F an isometric view of another embodiment of the MDATA.
Figure 6H:
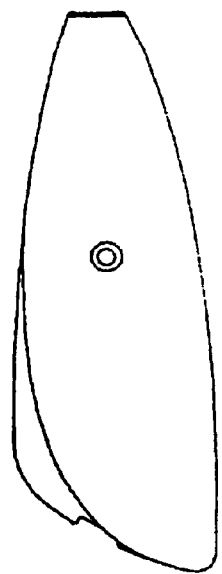
FIG. 6H is a back side view of another embodiment of the MDATA.
Figure 6E:
FIG. 6E is a top edge view of another embodiment of the MDATA.
Figure 6G:
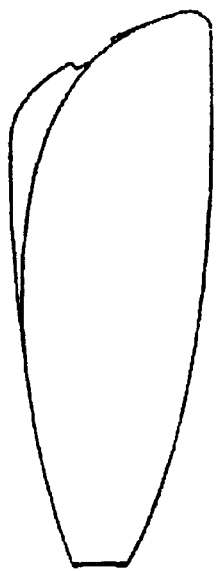
FIG. 6G is a front side view of another embodiment of the MDATA.

As shown in FIG. 5, the MDATA may be integrated into a host computer means and thereby require only that a scanner 20 and Digitizer 30 (depending on the scanner 20 type) be included. All other necessary parts of the MDATA being supplied by existing parts of the host computer means or by software running on the host computer means. Examples of host computer means include PDA's, cell phones, data tablets, laptop computers and digital cameras.

Other MDATA embodiments may also contain an imager (digital camera) for processing two-dimensional information or taking digital photographs. In these embodiments many of the different MDATA components are already present, requiring only minimal additions and software/firmware to add MDATA functionality. In the case of a CCD, the device may include a two LED structure or a one LED structure. A focusing lens may also be included.

Figure 11:
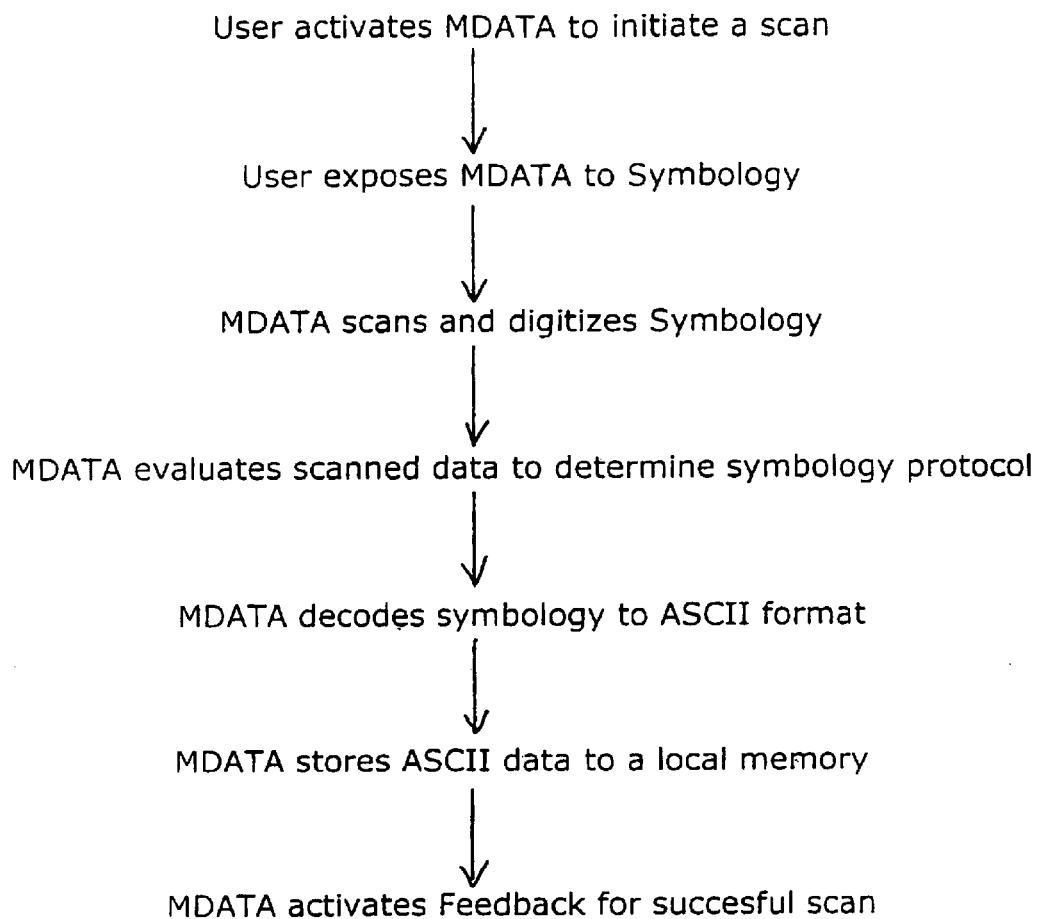
FIG. 11 is a block diagram of one embodiment of an MDATA data capture sequence.

As shown in FIG. 11, in one embodiment, a user activates the MDATA by pressing the switch 5. If the user then exposes the MDATA to a machine readable symbology, the scanner 20 scans the symbology, passing it to the digitizer 30 and then to the processor 40 or temporarily buffered in memory 50. The processor 40 evaluates the scanned data to determine a symbology protocol. If the symbology is identified, the scanned data is decoded according to the symbology and placed in memory 50 in, for example, ASCII format. Further scanned/decoded data is placed in memory as separate records or as a single data stream separated by record identifiers. If the MDATA is able to decode and store the symbol in memory 50, a "good read" feedback, for example a two-second illumination of the LED 10, is made. Other user feedback may include a "memory full" flashing of the LED 10 and then de-activation of the device or scanning with a first in first out over writing of the previous scanned data. During data transfer via a docking device, further user feedback may indicate a proper connection has been made, that a transfer is in progress and successfully or unsuccessfully completed. The docking device may also provide an LED, or other form of user feedback, for status indication, drawing power from the computer means and therefore minimizing the power drain on the MDATA's battery.

Figure 7:
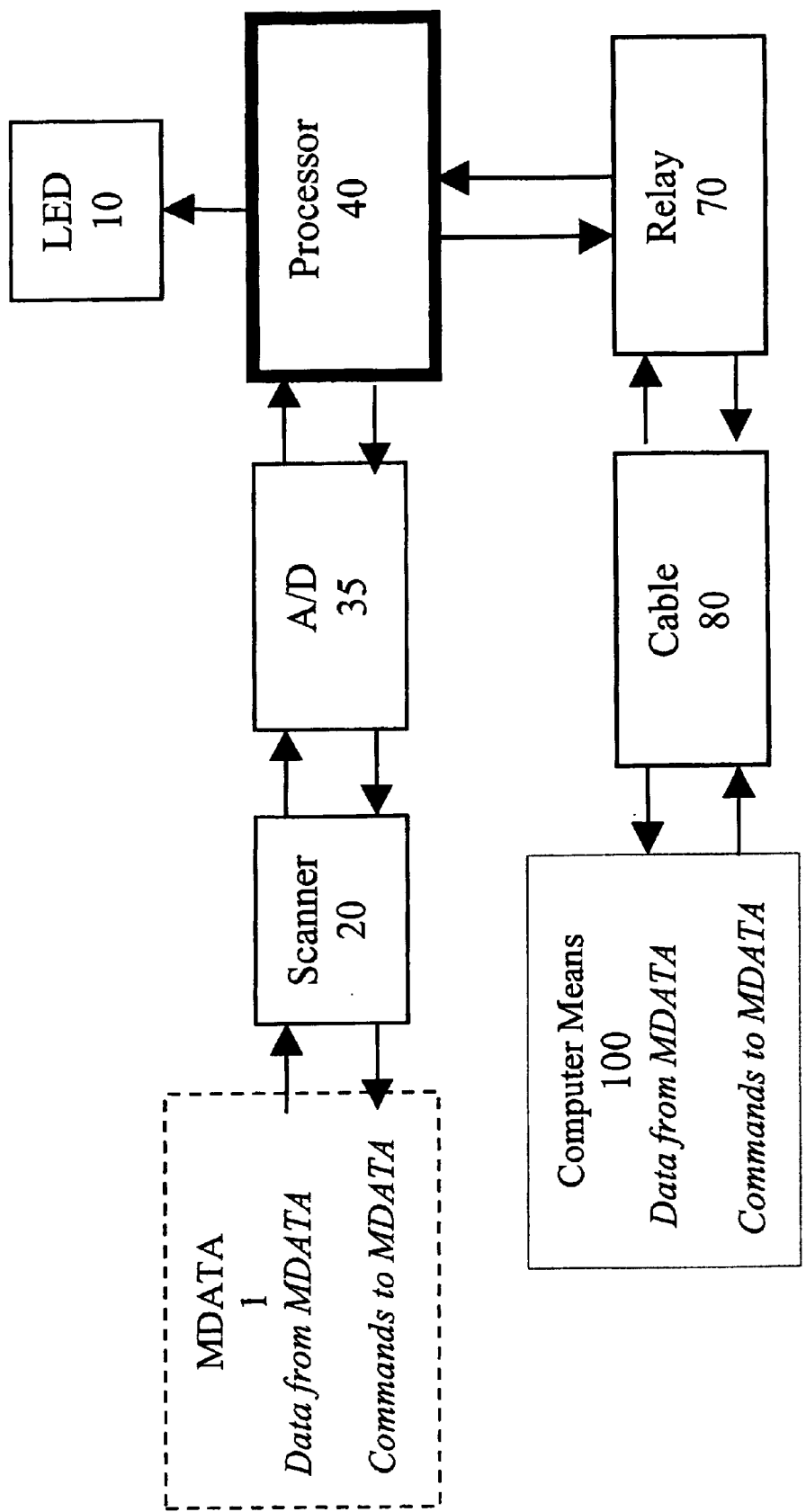
FIG. 7 is a block diagram of one embodiment of a docking device.

After scanning information into the MDATA, the MDATA may through direct electromechanical connection (cable or contacts), optically or RF transfer stored data to a computer device or may be inserted into a docking device which would accept the MDATA. In one embodiment, shown in block form in FIG. 7, the docking device may be an optical reader which would accept optical output from the keyfob in the form of light or other wavelength signals (Irda, infra red, sound, RF, visible light) which transmit the information contained in the memory of the MDATA. The docking device would then be capable of transmitting the received information to a computer device by direct connection, RF, or light signals (Irda, visible light, or fiber optic). A scanner 20 receives and sends optical signals that, depending on the direction of communication, are digitized or output by an Analog-Digital converter 35 connected to a processor 40. The processor 40 controls an isolation relay 70 to which a cable 80 is attached linking the docking device to a computer means 100, normally a personal computer, PDA or internet console. An LED 10 controlled by the processor 40 serves as a user feedback means of connection status and transfer progress.

The docking device cable 80 may be connected to the computer device by any available transmission standard or proprietary I/O port (serial, parallel, USB, audio input, PCMCIA, IDE, ISA, PCI, SCSI, Firewire, optical), including the keyboard port. In other embodiments, the docking device may be in the form of a mouse device or other computer peripheral with a mating cavity which the MDATA could fit into. For an optical mouse, the mouse position change emitter/detector sensors may be controlled by a device driver into the software MDATA client application. Built into a cell phone or PDA, the docking means may be an optical emitter/detector, Irda port or RFID interrogator circuitry.

One method for the docking device to connect to the computer is through the computer's keyboard port. The docking device could be integrated into the keyboard itself or placed inline with it via a wedge device. In another embodiment, the keyboard of a computer may itself include a docking device which would receive direct mechanical connection (cable or connectors), optical or RFID transfer from the MDATA and would be capable of sending control signals to the MDATA. The MDATA may further include a DIN/mini-DIN adapter.

The wedge device plugs into the computer's keyboard port (commonly a DIN or mini-DIN/PS-2 connector) and the keyboard and docking device both plug into the wedge device, allowing both to operate in turn, but not taking up any of the computer's available I/O ports or potentially creating a device conflict in the computer's operating system.

Figure 8:
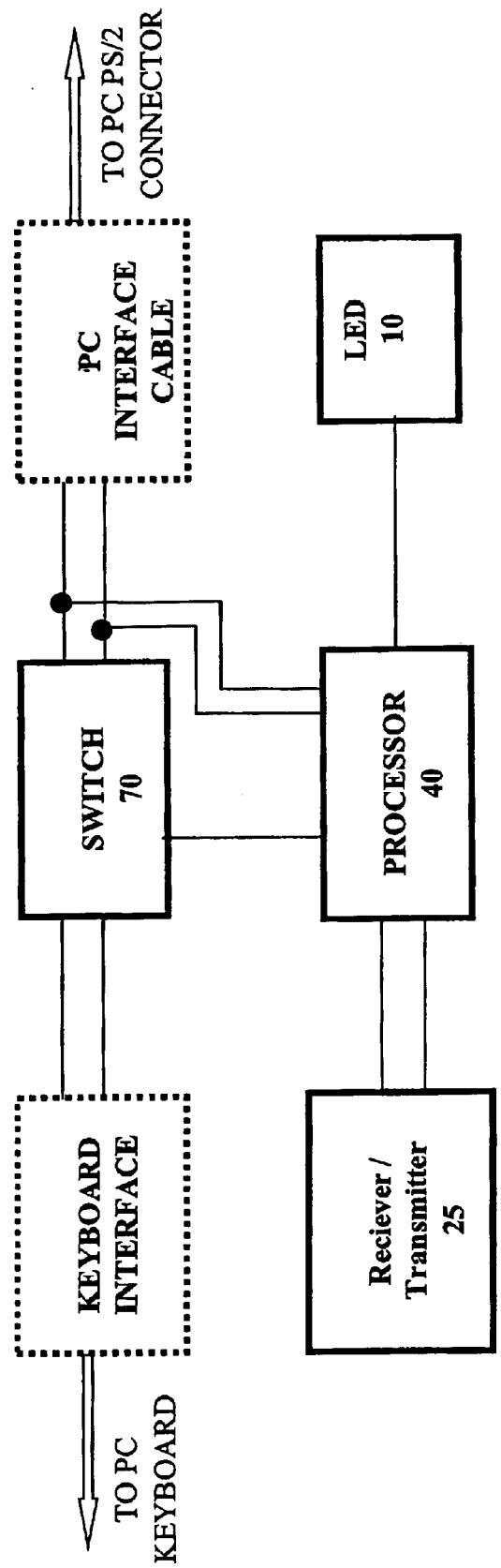
FIG. 8 is a block diagram of another embodiment of a docking device, connecting to a host via a keyboard port.

As shown in FIGS. 10A–C and 16, in one embodiment the docking device may be integrated into the wedge device to minimize overall cost and cabling complexity. The keyboard and computer keyboard port both connect to the docking device. Shown in simplified block form in FIG. 8, this embodiment includes an optical interface 25, processor 40, LED 10 and switch 70. The switch 70 interrupts the keyboard connection with it's computer, allowing the MDATA to take-over the keyboard port without risk of an errant keystroke interrupting communications between the MDATA and software running on the computer coordinating data transfers. When communications are complete, the keyboard is re-enabled.

Figure 9:
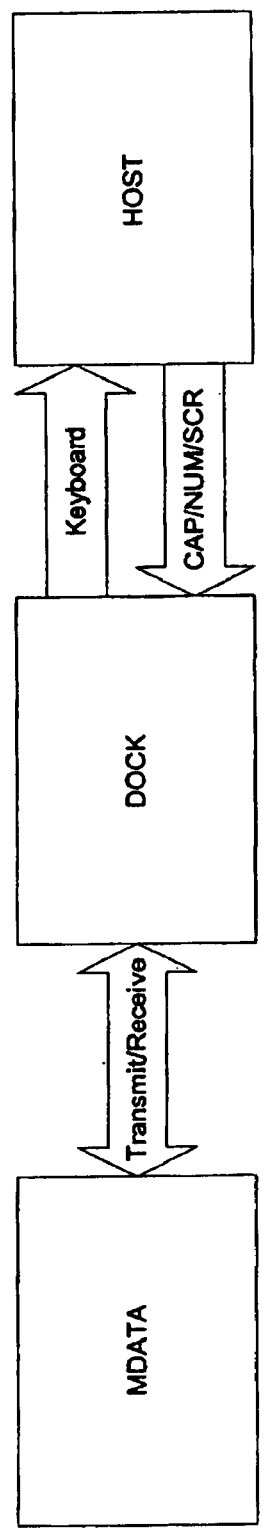
FIG. 9 is a block diagram illustrating information flow using the docking device of FIG. 8.

As shown in FIG. 9, through the docking device, the MDATA is capable of transmitting data signals, and then receiving data transmitted back through the keyboard port of a host computer means, for example a personal computer or internet portal device. Backward flow of information from the computer means to the MDATA is accomplished by utilization of the standard keyboard "caps lock", "num lock" and "scroll lock" feedback signals used to energize status LEDs on keyboards.

Figure 12:
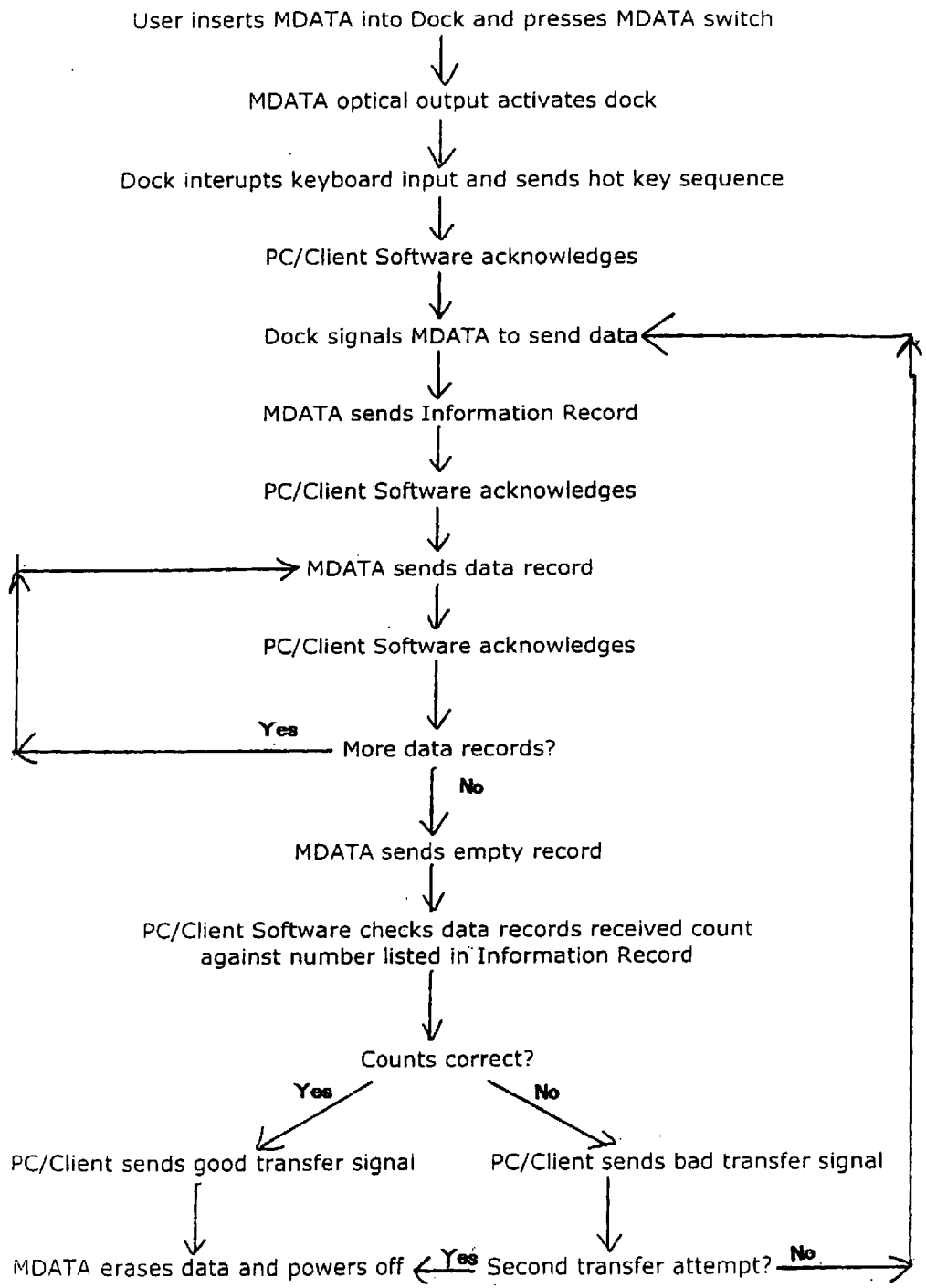
FIG. 12 is a block diagram of one embodiment of an MDATA data download sequence.

One embodiment of a data transfer method for a keyboard wedge type docking device is shown in FIG. 12. Upon insertion into the docking device, the user activates the MDATA by pressing the switch 5. The MDATA's initial power-up communications attempt activates the Docking device which then activates switch 70, isolating the keyboard. The docking device then sends a hot key sequence that a host computer means pc/client application monitoring the keyboard buffer detects and acknowledges by sending a keyboard status command to the docking device. The docking device then signals the MDATA to send it's stored data records. The MDATA then sends an information record containing its identifying information and version along with a count of the data records to be transmitted. The MDATA then transmits the data records, receiving an acknowledgement for each one from the docking device which passes the data records to the pc/client application. To signal end of transmission, the MDATA sends an empty record. The pc/client or docking device then checks the received record count against the number initally indicated by the information record transmitted from the MDATA. If the number of records matches, a good transfer signal is sent to the MDATA which then clears its memory and shuts down. If the number of records does not match, the MDATA is sent a bad transfer signal and the transfer routine is restarted. To prevent the MDATA battery from being drained, a limited number, for example two, transfer attempts are made before the MDATA shuts down, after resetting its memory.

The MDATA may be provided with firmware, which includes individual serial numbers, codes for security, data protocols and error checking. If an RFID is used, the RFID may incorporate the serial number at time of manufacturing. Individual serial numbers provide a unique link between the MDATA hardware device and the data transferred and or transactions performed. MDATA serial numbers registered to individuals allow secure transactions and data mining opportunities.

The device is able to scan a wide range of tag formats/symbologies/protocols allowing retrieval of information from existing product packaging without substantial modification or expense by manufacturers. In an optical embodiment, as shown for example in FIGS. 17A, 17B, 17C and 18, arrangement of the optical components in the scanner 20 and use of an aperture 130 increases the depth of field of the scanner (discussed below), allowing the scanning of symbols covered by shrink-wrap packaging, or for example, symbols within typical plastic compact disc (CD) enclosures for music, video or software CD's.

Wand or contact type optical scanners have previously required the medium on which the symbols, typically barcodes, are printed to be in contact with the light collecting lens of the scanning device. Depth of field refers to the capability of a scanner to successfully scan and decode barcodes even if scanned at a distance, above or below the expected location of the medium. In optical embodiments utilizing an LED or other point source wave (visible or invisible wavelengths) generator as the illumination means, this capability is created by the addition of an aperture to the optical arrangement. The position of the aperture in the optical path between light-collecting lens and photo receptor determines the optimal point for the light collection and hence the ideal focal plane at which the barcode holding medium should be placed for scanning. The form of the aperture opening determines the direction in which the scanner can operate and properties relating to ambient light rejection and noise-sensitivity. Previously, aperture types have only been "slit-types" permitting only uni-directional scanning. Use of bi-directional or omni-directional apertures adds bi-directional and omni-directional scanning capability to the scanner. Examples of aperture openings and associated scanning directions are:

1. Uni-Directional Scanning Apertures with one scan direction, for example vertical, (Slit aperture) as shown in FIG. 19A.
2. Bi-Directional Scanning Apertures with two scan directions, for example vertical and horizontal, as shown in FIGS. 19B and 19C.
3. Omni-Directional Scanning Apertures with scanning permissible in all directions as shown in FIGS. 19D, 19E and 19F.

Additional or alternative scan directions can be generated by combination as well as rotation of the above described patterns. Size of the openings will determine the available resolution for symbols, for example barcodes, as well as noise and ambient light rejection properties.

An MDATA may also be configured to read data from an LCD, digital or analog CRT video displays. In this embodiment or mode, the emitter may be disabled and the light emitting versus dark areas of the display surface scanned. The ability to scan active displays allows quick and easy loading of computer generated data into the MDATA without requiring a paper print out of, for example, bar codes which are then scanned. In the LCD/CRT scanning capable embodiment, MDATA users may scan dynamic data at the point where they accept, for example, a changing price for a sale or auction item.

To allow wide usability on existing product packaging, the MDATA can decode a wide range of commonly used symbologies. In one embodiment, the bar code decoding algorithms package from an Intermec 9730 Wedge Decoder may be used. Depending on memory size the MDATA may be capable of storing, for example, one hundred (100) scans of information into its memory. It may also be capable of transmitting bar code identifiers and or the MDATA serial number along with data. It may also send and receive encrypted data.

Figure 14:
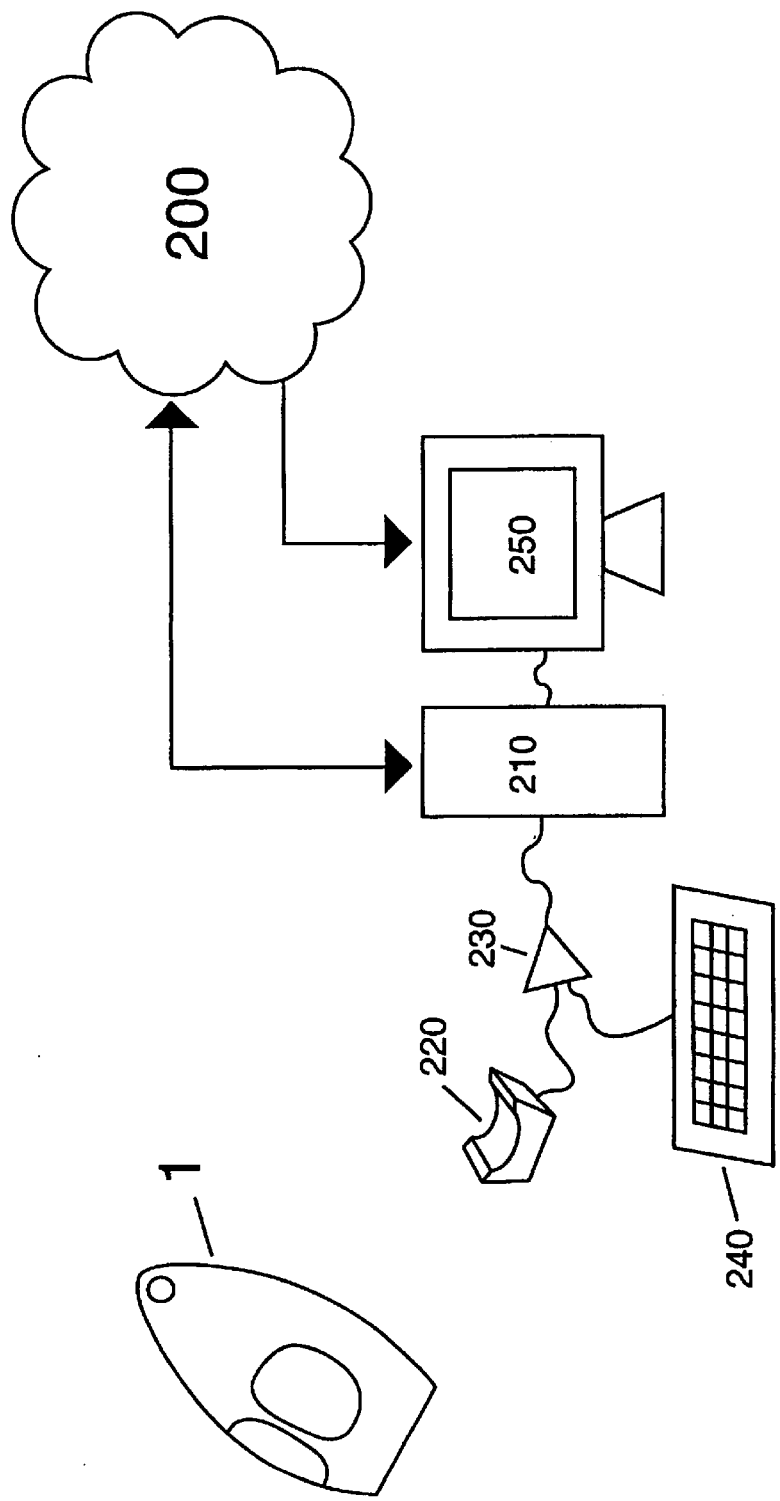
FIG. 14 is an illustration of a data acquisition and retrieval system using an MDATA.

The MDATA may be used as a component in a complete data acquisition and retrieval system. For example, as shown in FIG. 14, an internet 200 or other remote accessible data source linked host computer means 210 with a docking device 220 connected, for example via a wedge device 230 attached between the host computer's keyboard 240 and the host computer 210, or a docking device integrated with a wedge device, is used to receive data gathered with an MDATA 1. This data is then usable for linking the user to specific internet or other remote accessible data sources. Data may be downloaded to the host computer means for immediate review, storage and later review or piped directly to the users video 250 and or audio outputs, for example to show a video relating to the scanned data.

Figure 15:
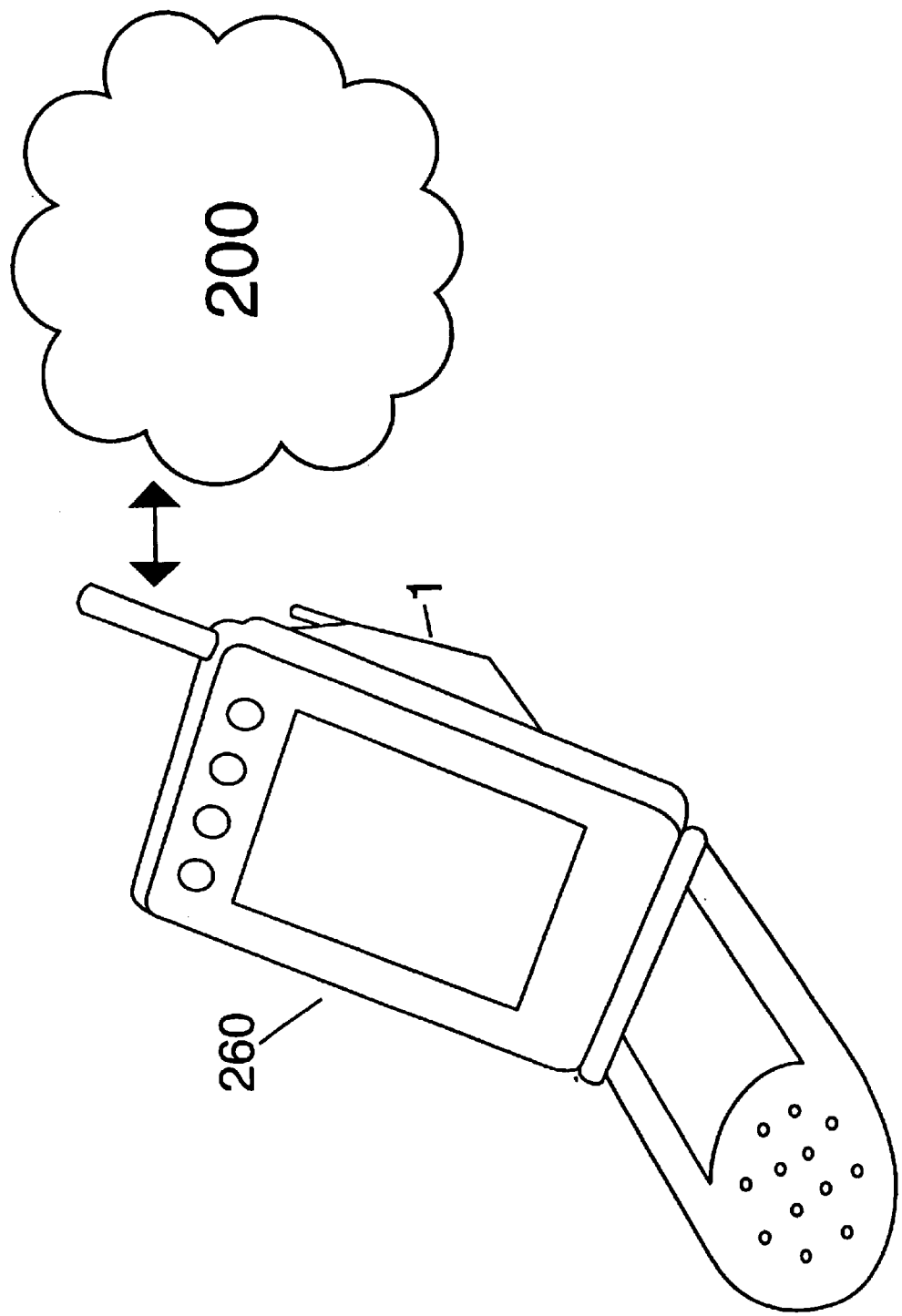
FIG. 15 is an illustration of a data acquisition and retrieval system using an MDATA integrated into a cell phone or wireless enabled PDA.

In a further embodiment, as shown in FIG. 15, the MDATA 1 may be integrated with or coupled to a cell phone or wireless enabled PDA 260. In this embodiment, a system is created with direct access capabilities from the MDATA through the cell phone or PDA into the internet 200 or other remote database, for sending and receiving information. In this embodiment, the consumer would have direct access to information relating to the scanned items at the instant of scanning the items in a retail establishment. This embodiment relies on the existing cellular phone infrastructure and does not require an expensive local wireless network be created, dedicated to the MDATA. To minimize expense, the cellular phone or wireless enabled PDA device need only be configured with a docking device or docking device functionality which the MDATA could then transfer data to.

Retail establishments can provide MDATA's to shoppers and place docking-enabled kiosks in the store so that shoppers could retrieve detailed product or service information while still on the premises, or from the kiosk preview or view information and then email it to their personal email accounts for later access.

Data scanned into the device can be encrypted so that it is only downloaded/retrievable by its user, and only used with the intended information retrieval service. Encryptions could be by a simple look-up and translation table stored in memory or firmware or by more complex algorithms. The encryption "key" may be configured to be changeable by scanning or uploading a new one into the MDATA or as a timed function relating to a fixed number of scans and or downloads which could be used to initiate an upload of a new encryption key. The encryption protocol or key may be configured to change upon each downloading based, for example, upon a time code and or the individual units serial number.

A further method of use allows a consumer to identify a desired product at a conventional sales outlet and by scanning its datatags/symbology, uniquely identify that item whereby the consumer can then search the internet for competitive pricing on identical products through e-commerce web sites and still be assured he is getting pricing on the identical item he was able to physically inspect at the initial conventional sales outlet. The unique serial number of each MDATA allows tracking of eventual purchases for data mining applications and credit systems for sales outlets that exposed the consumer to the product eventually purchased through e-commerce.

MDATA's may be alternatively configured to interact with each other, transferring specific scanned or otherwise loaded data records between units. This may include sharing contact information between individuals, replacing business cards/phone numbers easily misplaced and lost.

The MDATA may also be used in local settings. For example, an MDATA may be used as an order entry device. Employees or customers can select items from a database (catalog, menu, flyer) scan an associated symbol therein, and then have a detailed order filled without requiring repeated entry of the desired items description, thereby speeding the order process and controlling the exact time of order entry and avoiding order errors. The low price per unit of the MDATA concept would allow, for example, a restaurant to have an MDATA at every table for the customers to scan desired items out of a menu. Customers could then efficiently place their order by initiating an order download of the MDATA order-information without need for service staff to be available, or if available to anticipate when the customer was ready to order. If the MDATA's are broken or stolen, the low cost per unit minimizes replacement costs. Encryption of data when stored in memory and then transferred to the host computer prevents the MDATA from being a desirable object apart from its designated use, minimizing theft and or alternate use of MDATA's left unprotected, or distributed at or below cost as part of a subscription or advertising revenue business model proprietary data retrieval service.

Further, the MDATA has applications as a security device. In automobiles, for example, currently a fixed radio signal is often used in remote keys—this signal may be recorded or looked up from a manufacturer's reference. With the MDATA, a new security code or code switching algorithm could be uploaded into the MDATA by scanning at any time. Complex codes could be transferred in symbol form between users so that physical keys need never be exchanged to authorize other people's access. This allows key authorization via email or telefax. In use, the MDATA dock could be the "keyhole" of the secured item (automobile). The transfer method could be RF, RFID, electromechanical or optical—optical being extra secure as it would be very difficult to observe/record as compared to RF. If desired, the internal identification number of an MDATA may be used to make sure only one physical device could open a secured item, and the codes would be used for example to set time periods where access is granted—these codes being easily changeable by re-scanning them as often as desired.

An MDATA could be used as a verification means. A code transmitted electronically, when scanned into an MDATA with the correct identification number (previously known by the code creator) would ensure, for example, that a courier is turning his shipment over to the correct entity.

The verification means of the MDATA also lends itself to use as a smart credit card. Equipped with an RFID, an MDATA may be used to scan desired items as they are collected and upon passing through an interrogator gateway or other download means, the items are tabulated via a download of the MDATA's RFID and an electronic account linked to the MDATA's serial number debited. This method offers instantaneous checkout and saves the expense of having an RFID attached to each and every individual product and automatically registers (debits) the user upon their exit. Where a user is in, for example, a amusement park that may use the MDATA as a payment means the users statistics and experience levels may be stored on the MDATA to allow them to pick up at MDATA enabled video games at the same game level upon their return.

MDATA's may be built into consumer goods, for example toys. In a "smart" toy dog for example, new characteristics or scenarios may be loaded by merely scanning in a specific code.

Used in scan and remotely deliver scenarios, the MDATA enable a storefront to only maintain a stock of one each of a wide range of products to allow consumer inspection or even just product descriptions as in a catalog which a consumer may inspect and if desired, scan an associated symbol whereupon the scanned product is delivered to a specified location and or the users electronic account debited.

The MDATA has numerous consumer uses, providing scanning and data transfer technology in a user friendly manner at a previously unavailable price level. Individual libraries, collections of books, coins, cards etc. may be economically cataloged by individuals where previously this equipment was prohibitively expensive.

The present invention is entitled to a range of equivalents and is to be limited only by the following claims.

We claim:

1. A method for transferring data between a mobile data acquisition apparatus and a host computer, comprising the steps of:
   connecting a mobile data acquisition apparatus with a docking device connected to a host computer between a host computer keyboard port and a host computer keyboard;
   activating said apparatus, whereby said apparatus transmits a signal indicating the presence of said apparatus to said docking device;
   said docking device senses said signal from said apparatus and transmits a hot key interrupt sequence to said host computer;
   a software running on said host computer, monitoring said host computer keyboard port transmits a status indicator signal to said docking device;
   said docking device transmits an acknowledgement signal to said apparatus;
   said apparatus transmits an information record, indicating the number of data records stored in a mobile data acquisition apparatus memory;
   said apparatus transmits said data records to said docking device which passes said data records to said software application running on said host computer;
   said software counts the number of said records;
   if the number of said records is equal to said information record said software transmits a successful transfer signal to said docking device which passes said signal to said apparatus
   wherein said apparatus and or said docking device send empty records to indicate an end of record transmission.

2. The method of claim 1 wherein the mobile machine readable data acquisition apparatus comprises:
   a housing,
   a power means,
   a scanning means for scanning a machine readable symbology,
   a digitizer means receiving input from said scanning means and outputting a digital input signal for
   a processor means having a machine readable symbology identification and decoding function which is linked to
   a memory means for local data storage;
   said scanning means, said digitizer means, said processor means, said memory means and said power means arranged and configured within said housing, adapted to be energized by said power means,
   said scanning means comprises
   an optical sensor/receiver,
   a lens to focus optical signals, and
   an aperture between said lens and said optical sensor/receiver.

3. The method of claim 2 wherein:
   said scanning means comprises an optical sensor/receiver, and a lens to focus optical signals.

4. The method of claim 3 wherein:
   said scanning means further comprises an emitter.

5. The method of claim 4 wherein the apparatus has download means for downloading decoded machine readable symbols stored in said memory.

6. The method of claim 5 wherein:
said download means is via modulation of emitter.
7. The method of claim 5 wherein:
said download means is via an electro-mechanical connection.
8. The method of claim 5 wherein:
said download means is via an RFID.
9. The method of claim 2 wherein:
said processor means further comprises an encryption function for encrypting machine readable symbol data decoded by said processor.
10. The method of claim 9 wherein:
said encryption function is configurable.
11. The method of claim 9 wherein:
said encryption function is a mathematical algorithm.
12. The method of claim 9 wherein:
said encryption function is a translation table.
13. The method of claim 2 wherein:
said memory is an RFID circuit.
14. The method of claim 13 wherein:
said RFID circuit is operable as a transmitter.
15. The method of claim 13 wherein:
said RFID circuit is operable as a receiver.
16. The method of claim 2 wherein:
said apparatus includes an electronic serial number.
17. The method of claim 16 wherein:
said electronic serial number is located on an RFID circuit, and
said electronic serial number is permanently set at the time of manufacture of said RFID circuit.
18. The method of claim 2 wherein:
said scanning means has a depth of field which enables the scanning of symbologies located within a Compact Disc case through said Compact Disc case.
19. The method of claim 2 wherein:
said aperture is a slit, enabling uni-directional scanning.
20. The method of claim 2 wherein:
said aperture has a cross or star form, enabling bi-directional scanning.
21. The method of claim 2 wherein:
said aperture has a circle, ellipsoid or rectangular form, enabling omni-directional scanning.
22. The method of claim 2 wherein:
said apparatus has a total weight of 20 grams or less.
23. The method of claim 2 wherein:
said apparatus further comprises at least one switch, said switch operable to initiate an apparatus function with a single actuation, without requiring continued actuation of said switch.
24. The method of claim 2, wherein
said apparatus has a volume of 14 cubic centimeters or less.
25. The method of claim 1 wherein an apparatus identification code downloaded.
26. The method of claim 1 wherein upon receipt of said successful transfer signal said apparatus clears said mobile data acquisition apparatus memory.
27. The method of claim 26 wherein said data records are transmitted from said apparatus in encrypted form and said data records are unencrypted by said software running on said host computer.
28. The method of claim 26 wherein an apparatus identification code downloaded.
29. The method of claim 28 wherein an apparatus identification code downloaded.
30. The method of claim 1 wherein said data records are transmitted from said apparatus in encrypted form and said data records are unencrypted by said software running on said host computer.
31. The method of claim 30 wherein an apparatus identification code downloaded.
32. A method for transferring data between a mobile data acquisition apparatus and a host computer, comprising the steps of:
connecting a mobile data acquisition apparatus with a docking device connected to a host computer between a host computer keyboard port and a host computer keyboard;
activating said apparatus, whereby said apparatus transmits a signal indicating the presence of said apparatus to said docking device;
said docking device senses said signal from said apparatus and transmits a hot key interrupt sequence to said host computer;
a software running on said host computer, monitoring said host computer keyboard port transmits a status indicator signal to said docking device;
said docking device transmits an acknowledgement signal to said apparatus;
said apparatus transmits an information record, indicating the number of data records stored in a mobile data acquisition apparatus memory;
said apparatus transmits said data records to said docking device which passes said data records to said software application running on said host computer;
said software counts the number of said records;
if the number of said records is equal to said information record said software transmits a successful transfer signal to said docking device which passes said signal to said apparatus
wherein upon receipt of said successful transfer signal said apparatus clears said mobile data acquisition apparatus memory.
33. The method of claim 32 wherein said data records are transmitted from said apparatus in encrypted form and said data records are unencrypted by said software running on said host computer.
34. The method of claim 33 wherein an apparatus identification code downloaded.
35. The method of claim 32 wherein an apparatus identification code downloaded.
36. A method for transferring data between a mobile data acquisition apparatus and a host computer, comprising the steps of:
connecting a mobile data acquisition apparatus with a docking device connected to a host computer between a host computer keyboard port and a host computer keyboard;
activating said apparatus, whereby said apparatus transmits a signal indicating the presence of said apparatus to said docking device;
said docking device senses said signal from said apparatus and transmits a hot key interrupt sequence to said host computer;
a software running on said host computer, monitoring said host computer keyboard port transmits a status indicator signal to said docking device;
said docking device transmits an acknowledgement signal to said apparatus;

said apparatus transmits an information record, indicating the number of data records stored in a mobile data acquisition apparatus memory;

said apparatus transmits said data records to said docking device which passes said data records to said software application running on said host computer;

said software counts the number of said records;

if the number of said records is equal to said information record said software transmits a successful transfer signal to said docking device which passes said signal to said apparatus wherein said data records are transmitted from said apparatus in encrypted form, and said data records are unencrypted by said software running on said host computer.

37. The method of claim 36 wherein an apparatus identification code downloaded.

38. A method for transferring data between a mobile data acquisition apparatus and a host computer, comprising the steps of:

connecting a mobile data acquisition apparatus with a docking device connected to a host computer between a host computer keyboard port and a host computer keyboard;

activating said apparatus, whereby said apparatus transmits a signal indicating the presence of said apparatus to said docking device;

said docking device senses said signal from said apparatus and transmits a hot key interrupt sequence to said host computer;

a software running on said host computer, monitoring said host computer keyboard port transmits a status indicator signal to said docking device;

said docking device transmits an acknowledgement signal to said apparatus;

said apparatus transmits an information record, indicating the number of data records stored in a mobile data acquisition apparatus memory;

said apparatus transmits said data records to said docking device which passes said data records to said software application running on said host computer;

said software counts the number of said records;

if the number of said records is equal to said information record said software transmits a successful transfer signal to said docking device which passes said signal to said apparatus wherein an apparatus identification code downloaded.

39. A re-configurable electronic key, comprising:

a housing, a power means, a scanning means for scanning a machine readable symbology, said scanning means comprising a lens to focus optical signals and an aperture between said lens and a sensor/receiver, a digitizer means receiving input from said scanning means and outputting a digital input signal for a processor means having a machine readable symbology decoding function which is linked to a memory means for local data storage;

an output means, for outputting a stored key sequence, said scanning means, said digitizer means, said processor means, said memory means and said power means arranged and configured within said housing, adapted to be energized by said power means, said key configurable by scanning a machine readable symbology wherein said scanning means is an optical scanner and said output means is an optical emitter.

40. The key of claim 39, further comprising:

an electronic serial number.

41. A method for using an electronic key, comprising the steps of:

associating an access right with a user;

scanning a symbology describing said access right into an electronic key;

said electronic key comprising:

a housing, a power means, an optical scanner for scanning a machine readable symbology, said optical scanner comprising a lens to focus optical signals and an aperture between said lens and a sensor/receiver, a digitizer means receiving input from said optical scanner and outputting a digital input signal for a processor means having a machine readable symbology decoding function which is linked to a memory means for local data storage;

an optical emitter, for outputting a stored key sequence, said optical scanner, said digitizer means, said processor means, said memory means and said power means arranged and configured within said housing, adapted to be energized by said power means, said key configurable by scanning a machine readable symbology, providing said key to said user;

allowing access to said user upon said users downloading of a memory in said electronic key containing said access right; and transmitting said symbology from a remote location for said user to scan into said key upon receipt.

42. The method of claim 41 further including the steps of:

associating a serial number with said symbology;

allowing access only if said key contains an electronic serial number matching said serial number.

43. A system for acquiring information, comprising:

a mobile data acquisition apparatus with a scanning means for reading a machine readable symbology and a memory means, said data acquisition device comprising:

a housing, a power means, a scanning means for scanning a machine readable symbology, a digitizer means receiving input from said scanning means and outputting a digital input signal for a processor means having a machine readable symbology identification and decoding function which is linked to a memory means for local data storage;

said scanning means, said digitizer means, said processor means, said memory means and said power means arranged and configured within said housing, adapted to be energized by said power means, said scanning means comprises: an optical sensor/receiver, a lens to focus optical signals, and an aperture between said lens and said optical sensor/receiver, a host computer means with a connection to a remote information source;

a communication means for information transfer between said apparatus storage means and said host computer means;

said apparatus arranged and configured to use said scanning means for scanning a machine readable symbology;

said symbology identifying an object for which information is desired; and said host computer arranged and configured to receive information from said remote information source associated with said symbology wherein said apparatus further comprises a housing, a power means, a digitizer means receiving input from said scanning means and outputting a digital input signal for a processor means having a machine readable symbology identification and decoding function which is linked to said memory means;

said scanning means, said digitizer means, said processor means, said memory means and said power means arranged and configured within said housing, adapted to be energized by said power means.

44. The system of claim 43, wherein:

said apparatus and said host computer means are integrated into a cellular telephone.

\* \* \* \* \*